United States Patent [11] 3,527,225

[72] Inventor David F. Smith
 120 Grove St., Bay Head, New Jersey 08744
[21] Appl. No. 400,208
[22] Filed Sept. 29, 1964
[45] Patented Sept. 8, 1970

[54] RESORBABLE SURGICAL SUTURES FROM FIBROUS PROTEINS
 33 Claims, No Drawings

[52] U.S. Cl. .................................................. 128/335.5,
 8/127.6, 106/124, 106/149, 260/123
[51] Int. Cl. ............................................. A61l 17/00
[50] Field of Search ..................................... 128/335.5;
 106/124, 149; 260/123; 8/127.6; 161/227

[56] References Cited
 UNITED STATES PATENTS

| 1,316,854 | 9/1919 | Ostenberg ................... | 106/149 |
| 2,092,512 | 9/1937 | Herrmann et al. ........... | 128/335.5 |
| 2,640,752 | 6/1953 | Davis et al. ................. | 128/335.5 |
| 2,748,774 | 6/1956 | Novak ........................ | 128/335.5 |
| 3,114,591 | 12/1963 | Nichols et al. ............... | 128/335.5 |

FOREIGN PATENTS

| 900,181 | 7/1962 | Great Britain..... 128/Collagen Digest |

Primary Examiner—Dalton L. Truluck

ABSTRACT: Resorbable surgical sutures are disclosed which are constructed of protein fibrils cross-linked by 1 to 6 percent of their weight of chemically bonded acids such as amino, polybasic polyamino and mucopolysaccharide acids, the fibrils being longitudinally oriented through polar groups so as to form relatively inextensible strands having tensile strengths at least 75 percent that of similar catgut strands.

RESORBABLE SURGICAL SUTURES FROM FIBROUS PROTEINS

Presently available resorbable surgical sutures are made by largely subjective mechanical methods from sheep intestines. Such material (called "catgut" or "surgical gut") is variable in its resorption characteristics, in tissue reaction, diameter and strength. Control of quality and uniformity is unsatisfactory due to variations along a single strand and from strand to strand, dependent upon uncontrollable variations in manufacturing and even upon age and condition of the animal source. The necessary statistical quality control is cumbersome and leads to much rejected material. Since many surgeons wish to have buried sutures resorb in the tissues as the wound heals so as to eventually leave no foreign body therein, it is highly desirable to make available a more satisfactory material; but so far efforts in this direction have not succeeded in producing an acceptable substitute for catgut.

A satisfactory resorbable suture should have a tensile strength at least 75 percent that of catgut. It should not be irritating, toxic or allergenic. A surgeon's knot in it should not slip and it must not be stretchable (like a rubber band) since continuing tension on the tissues causes trauma and necrosis.

Normally, different types of catgut sutures are used—some that resorb in the tissues in 4 to 6 days and some requiring 40 days or even longer. These types range from plain, untreated, heat-sterilized catgut to lightly, moderately or heavily chrome-tanned material. It must be pointed out, however, that resorption times for surgical gut in animal tissues are subject to some variation and sometimes residues of catgut remain in animal tissue for considerable periods. (See H. P. Jenkins, Archives of Surgery, vol. 44, p. 881, May 1942; vol. 45, p. 74, July 1942.) The tendency is for surgeons to use very small diameter sutures, in which case these residues can be very small—but this makes high and uniform strength very important.

Sutures are normally provided in strands of roughly circular cross-section, of diameters from about 1 to 30 mils and in lengths from 18 to 54 inches.

It appears that past failures in reconstituting fibrous protein strands may have been due, among other difficulties, to inability to satisfactorily uncoil, orient and cross-bond the fibrils in the reconstituted strand so that a strong, unstretchable suture could be made. The methods of the present invention succeed in overcoming these difficulties.

If a de-fatted and purified but essentially undegraded fibrous protein is formed into a sol by soaking in a slightly alkaline aqueous solution followed by dialyzing to remove electrolytes, the protein can be precipitated from the sol to form a gel, by certain polyvalent cations such as cadmium, copper, lead, zinc and lanthanum. If a layer of such a gel is formed in a certain configuration, diffusion of these polyvalent cations through the first, thin layer forms succeeding parallel layers in which the fibrils are oriented through their polar groups under the influence of the diffusion- and membrane-potential arising from the diffusion and separation of oppositely-charged ions. (See Der Mathematische und Naturwissenschaftliche Unterricht, 16 Band, Heft 4, 1 Sept. 1963, pp. 145—148; Ferd. Dummlers Verlag, West Germany.) It appears that such oriented fibrils can be cross-linked through certain polybasic polyacids such as those normally found in animal tissue—the so-called mucopolysaccharide acids or mucins, such as hyaluronic acid (see Meyer, Palmer, J. Biol. Chem. 107, 629, 1934; 114, 689, 1936; Kendall, Dawson, Heidelberger, ibid. 118, 61, 1937; Meyer, Smyth, Dawson, ibid. 128, 319, 1939; Kabat, ibid. 130, 143, 1939; Claude, Proc. Soc. Exptl. Biol. Med. 43, 684, 1940; Meyer, Chaffee, J. Biol. Chem. 138, 491, 1940.) and chondroitin sulfuric acid (see Bray, Gregory, Stacey, Biochem. J. 38, 142, 1944.) and by certain polycarboxy complex amino acids such as aspartic acid, glutamic acid, hydroxyglutamic acid, proline, creatine, arginine, histidine, leucine, lysine, methionine, phenylalanine, serine, tryptophane, tyrosine, valine and preferably the higher molecular weight polybasic amino acids of these. The latter are called polybasic polyamino acids in order to distinguish them from monobasic amino acids of low molecular weight. Polycarboxy polyamino acids are meant to be included in the designation "polybasic polamino acids". The partially hydrolyzed proteins, called protein hydrolysates, are also applicable. Thus if the alkaline sol contains 1 to 5 or even 6 percent of such polybasic acids or mucins, the diffusion of the above-named polyvalent cations through the layers of gel results in uncoiling and orientation of the protein fibrils and cross-linking between adjacent fibrils. After such orienting and cross-bonding of the fibrils, the polyvalent cations in the structure may be replaced by hydrogen ions from dilute (0.01 to 1.0 normal) HCl or other strong acid, followed by washing out the acid and salts with water. When such a structure is stretched and dried, there results a material that is strong in the stretched and oriented direction, possesses three-dimensional stability and is largely non-stretchable if dried under tension.

Animal sources of fibrous proteins are the collagen-elastin tissues such as intestinal walls, blood vessel walls and, preferably, tendon material. A suitable fibrous protein from vegetable sources is zein, obtained from corn.

The following examples are given as illustrative of the present invention, but not by way of limitation, it being recognized that modifications and variations within the scope of this invention can be made by those skilled in the art.

EXAMPLE 1

Five grams of bovine tendon, separated from adhering fat is chopped into pieces of the dimensions of about 1 or 2 mm. The comminuted material is shaken over a period of about 1½ hours with separate portions of acetone in order to remove fat. The defatted material is washed with water and allowed to soak for several days in water containing a few drops of chloroform as preservative. The water is then drained off and the tendon material soaked in about 250 ml. of 0.4 normal lithium hydroxide at room temperature for 1 week, draining off and renewing the LiOH about 9 times. There is then added another 250 ml. of 0.4 N. LiOH and the mixture stirred in a high speed mixer and it is then dialyzed for 1 week to remove all salts and dialyzable electrolytes. At this point there remains a viscous sol. To this sol was added 3 percent of the weight of tendon material, of chondroitin sulfuric acid (See Bray et al., Biochem. J. 38, 142, 1944.) The mixture is then forced through a fine orifice (about 3 mils diameter) into a 1 N. cadmium nitrate solution, the strand being stretched as it is slowly drawn out. The strand is then washed in water and then soaked in 0.01 N. HCl. It is then again washed in water and dried in stretched condition for 3 days at room temperature. Its diameter was 2 mils. It was largely unstretchable and firm and held a surgeon's knot well. Its tensile strength was about 0.18 lb. as compared with an about equal strength for a similar strand of catgut. A portion of the strand was dried to slightly under 12 percent moisture as determined by the Karl Fischer method (U.S. Pharmacopeia, 16th revision, 1960, p. 939, Mack Printing Co., Easton, Pa.), sterilized by the standard "dry heat" cycle by heating in xylene as used for surgical gut and implanted in the abdominal muscles of a rabbit. It disintegrated in 6 days.

EXAMPLE 2

A cellophane dialysis tube with the bottom end closed was filled with 1 normal cadmium nitrate solution and immersed in the viscous sol of tendon material of Example 1 mixed with 4 percent of chondroitin sulfuric acid based on the weight of tendon material therein. Overnight a thin film of gel collected over the outer surface of the tube due to diffusion of cadmium ions into the sol. The solution was then removed from the tube and the tube and film washed and the film contacted with 0.01 normal HCl for several hours. The film was then washed to remove acid and salts, stripped from the cellophane and a narrow strip of it twisted into a strand and dried at room temperature for 3 days under tension. At this point it was dry, firm and largely unstretchable. It held a surgeon's knot well, measured 3.5 mils in diameter and had a tensile strength of 0.5 lb. as compared with about the same strength for a similar strand of surgical gut. A portion of this strand, after sterilization as in Example 1, disintegrated in the abdominal muscle of a rabbit in about 7 days.

EXAMPLE 3

A portion of the strand from Example 2 was soaked for 5 to 6 hours in a slightly alkaline solution of chromic sulfate. The strand was then thoroughly washed in water, sterilized as in Example 1 and implanted in the abdominal muscles of a rabbit. It disintegrated in about 40 days. The strand also held a knot well and was essentially non-stretchable.

Results similar to those of Examples 1, 2, and 3 are obtained when zein is substituted for bovine tendon material.

Since it is found that smaller diameter strands and thinner films are stronger per unit cross-sectional area, it is preferred to make the larger diameter sutures by twisting together at least two strands or braiding together at least three strands, or by twisting together at least two narrow, thin films or braiding together at least three narrow, thin films. Also, it is impractical to make too large diameter strands or too thick films because it requires too much time for the treating solutions to penetrate from outside to center. Knot holding is also better with the multi-ply strands. For these reasons it is preferred to use strands not over about 10 mils in diameter, and better still, not over 5 mils; likewise films should not be over about 10 mils in thickness and preferably not over 5 mils thick. It is further found that a very light treatment with formaldehyde or a very light chrome tanning improves knot holding without largely increasing resorption time.

Treating strands to reduce stretchability is very important and requires in each case drying in the stretched condition and/or heating to 40 to 60°C. under tension, preferably just below the limit of stretchability of the strands; and preferably to about 12 percent moisture.

In place of LiOH in making the protein sols, NaOH or KOH can be used but LiOH appears best, perhaps because Li is the most highly hydrated of the alkali metal ions.

It is found also that adjustment in suture strength can be made as required by increasing the proportion of the cross-bonding agent to protein. For example, an increase of chondroitin sulfuric acid from 2 percent of the weight of tendon material to 4 percent results in considerable increase in strength of the resulting suture, as well as decreasing its stretchability.

All percentages given herein are by weight.

I claim:

1. A resorbable surgical suture comprising a strand of twisted narrow thin film of an essentially fat-free comminuted fibrous protein in which the fibrils are oriented lengthwise of the film and cross-bonded in the film by 1 to 6 percent by weight of a mucopolysaccharide acid, said strand being relatively inextensible and having a tensile strength at least 75 percent of that of a similar strand of catgut of the same diameter.

2. The product of claim 1 wherein the said strand is composite and comprises at least two of the said twisted narrow thin films.

3. The product of claim 1 wherein the said strand is composite and comprises at least three of the said narrow thin films braided together.

4. The product of claim 1 wherein the said fat-free comminuted fibrous protein is collagen-elastin from animal tissue.

5. The product of claim 1 wherein the said fibrous protein is zein.

6. The product of claim 1 which is chrome-tanned.

7. A resorbable surgical suture comprising a small diameter strand of an essentially fat-free comminuted fibrous protein in which the protein fibrils are oriented lengthwise of the strand and cross-bonded in the strand between polar groups of adjacent fibrils by 1 to 6 percent by weight of a macopolysaccaride acid, said strand being relatively inextensible and having a tensile strength at least 75 percent of that of a similar strand of catgut of the same diameter.

8. The product of claim 7 wherein the said strand is composite and comprises at least two of the said strands twisted together.

9. The product of claim 7 wherein the said strand is composite and comprises at least three of the said strands braided together.

10. The product of claim 7 wherein the said fat-free comminuted fibrous protein is collagen-elastin from animal tissue.

11. The product of claim 7 wherein the said fibrous protein is zein.

12. The product of claim 7 which is chrome-tanned.

13. The product of claim 15 wherein the said fibrous protein is zein.

14. The product of claim 8 wherein the said fibrous protein is zein.

15. The product of claim 3 wherein the said fibrous protein is zein.

16. The product of claim 9 wherein the said fibrous protein is zein.

17. A resorbable surgical suture which comprises a strand of at least one twisted narrow thin film of an essentially fat-free comminuted fibrous protein, said film comprising fibrils of said protein with 1 to 6 percent of their weight of chemically bound cross-links comprising at least one acid selected from the class consisting of amino acids, polybasic polyamino acids mucopolysaccharide acids, said fibrils being closely contacted with each other and longitudinally oriented by deposition on a smooth surface from a dialyzed viscous slightly alkaline aqueous sol of said protein, of thin layers of the precipitated metal-cation gel of said protein with at least one of the gel-forming cations selected from the class consisting of cadmium, copper, lead, zinc and lanthanum, said deposition and orientation being a result of diffusion of ions into said sol through a smooth porous surface and through thin layers of said precipitated gel as they are formed, whereby a diffusion- and membrane-potential acts upon the polar groups of said gel to orient the fibrils; said metal cations being subsequently replaced by the hydrogen ions of a dilute strong acid; and said twisted narrow thin film having been finally washed with water and then dried under tension longitudinally in order to reduce its extensibility; and said strand having a tensile strength at least 75 percent of that of a similar strand of catgut of the same diameter.

18. The product of claim 17 wherein the said acid selected is chondroitin sulfuric acid.

19. The product of claim 17 wherein the said acid selected is hyaluronic acid.

20. The product of claim 17 wherein the said fibrous protein is defatted collagen.

21. The product of claim 17 wherein the said protein is zein.

22. The product of claim 17 wherein the said lithium hydroxide is replaced by a material selected from the class consisting of sodium hydroxide and potassium hydroxide.

23. A resorbable surgical suture in the form of a long narrow strand of a diameter of not over 10 mils which comprises comminuted fibrous protein fibrils cross-linked by 1 to 6 percent of their weight of at least one acid selected from the class consisting of amino acids, polybasic polyamino acids and mucopolysaccharide acids, said fibrils being closely contacted and longitudinally oriented by extrusion of a dialyzed viscous slightly alkaline aqueous sol of said fibrils through a fine orifice into a dilute aqueous solution containing at least one of the gel-forming cations selected from the class consisting of cadmium, copper, lead, zinc and lanthanum so as to form a stretched strand of a gel of the said protein with said cation, thereby giving rise to a fibril-orienting diffusion- and membrane-potential as diffusion of ions into said strand occurs; said cation having been subsequently replaced by the hydrogen ion of a dilute strong acid and said strand having been finally washed with water and then dried under tension in its longitudinal direction in order to reduce its extensibility; and said strand having a tensile strength of at least 75 percent that of a similar strand of catgut of the same diameter.

24. The product of claim 23 wherein the said protein is defatted collagen.

25. The product of claim 23 wherein the said protein is zein.

26. The product of claim 23 wherein the said lithium hydroxide is replaced by a material selected from the class consisting of sodium hydroxide and potassium hydroxide.

27. A material for use in making a resorbable surgical suture, which comprises fibrous protein fibrils in close contact, stretched in at least one direction, cross-linked with from 1 to 6 percent of their weight of at least one acid selected from the class consisting of amino acids, polybasic polyamino acids and mucopolysaccharide acids; said fibrils being oriented in at least the one said direction by reaction of said fibrils in the form of a dialyzed viscous aqueous lithium hydroxide sol, to produce a gel in combination with at least one of the gel-forming cations selected from the class consisting of cadmium, copper, lead, zinc and lanthanum; said orientation having been induced by the diffusion- and membrane-potential arising due to the diffusion of ions through said gel; said cation having been subsequently replaced by the hydrogen ion of a dilute strong acid and said material having been finally washed with water and then dried under tension in the said one direction in order to reduce its extensibility.

28. The product of claim 27 wherein the said lithium hydroxide is replaced by a material selected from the class consisting of sodium hydroxide and potassium hydroxide.

29. The product of claim 27 which has been treated with formaldehyde.

30. A composition for use as an intermediate in the formation of a resorbable surgical suture, which comprises a dialyzed viscous aqueous lithium hydroxide-fibrous protein sol containing from 1 to 6 percent of the weight of protein of at least one of the fibril-cross-linking agents selected from the class consisting of amino acids, polybasic polyamino acids and mucopolysaccharide acids, and diffused with at least one of the gel-forming cations selected from the class consisting of cadmium, copper, lead, zinc and lanthanum.

31. The composition of claim 30 wherein the said lithium hydroxide is replaced by a material selected from the class consisting of sodium hydroxide and potassium hydroxide.

32. The composition of claim 30 wherein the said protein is collagen.

33. The composition of claim 30 wherein the said protein is zein.

UNITED STATES PATENT OFFICE
CERTIFICATE OF CORRECTION

Patent No. 3,527,225                          September 8, 1970

David F. Smith

It is certified that error appears in the above identified patent and that said Letters Patent are hereby corrected as shown below:

Column 2, line 4, "polamino" should read -- polyamino --. Column 4, lines 1 and 2, "macopolysaccaride" should read -- mucopolysaccharide --; line 16, claim reference numeral "15" should read -- 7 --; line 30, after "polyamino acids" insert -- and --; lines 56 and 57, "lithium hydroxide" should read -- slightly alkaline --; lines 57 and 58, "a material selected from the class consisting sodium hydroxide and potassium hydroxide" should read -- lithium hydroxide --. Column 5, lines 8 and 9, "lithium hydroxide" should read -- slightly alkaline --; lines 9 and 10, "a material selected from the class consisting of sodium hydroxide and potassium hydroxide" should read -- lithium hydroxide --.

Signed and sealed this 23rd day of March 1971.

(SEAL)
Attest:

EDWARD M. FLETCHER, JR.                    WILLIAM E. SCHUYLER, JR.
Attesting Officer                             Commissioner of Patents